(No Model.)
C. D. ROGERS.
HEADED BOLT OR SCREW.
No. 461,621. Patented Oct. 20, 1891.
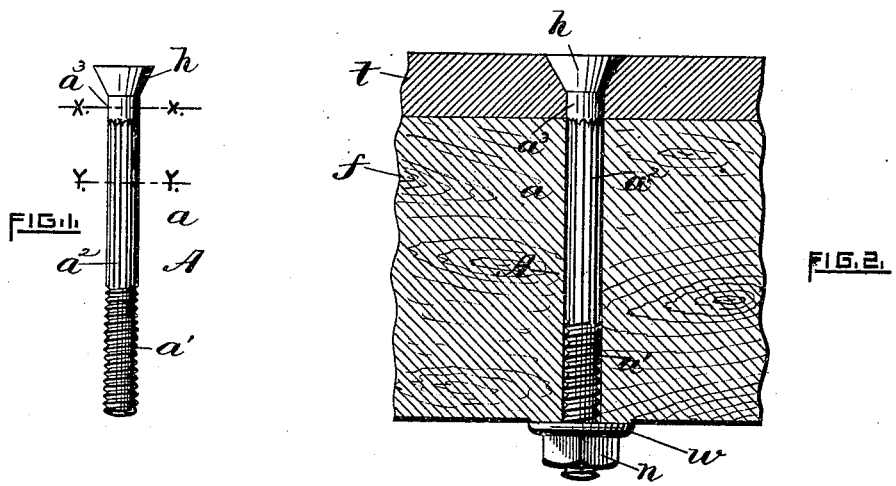
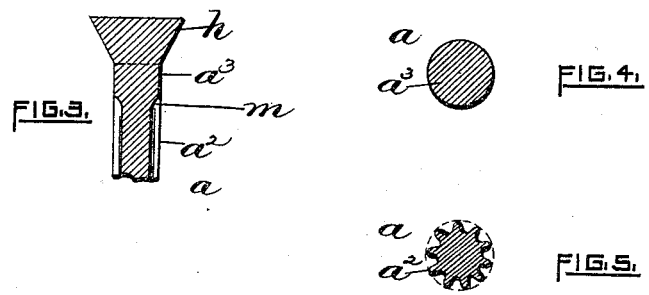
WITNESSES.
Charles Hannigan
H. E. Carpenter
INVENTOR.
Charles D. Rogers.
by Remington & Henthorn
Attys.
THE NORRIS PETERS CO., PHOTO-LITHO., WASHINGTON, D. C.

UNITED STATES PATENT OFFICE.

CHARLES D. ROGERS, OF PROVIDENCE, RHODE ISLAND, ASSIGNOR TO THE AMERICAN SCREW COMPANY, OF SAME PLACE.

HEADED BOLT OR SCREW.

SPECIFICATION forming part of Letters Patent No. 461,621, dated October 20, 1891.

Application filed April 18, 1891. Serial No. 389,492. (No model.)

*To all whom it may concern:*

Be it known that I, CHARLES D. ROGERS, a citizen of the United States, residing at Providence, in the county of Providence and State of Rhode Island, have invented certain new and useful Improvements in Headed Bolts or Screws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Tire-bolts as usually made, particularly those having cut screw-threads, have been provided with a plain shank portion having a head at one end and a screw-threaded portion at the other. Sometimes the periphery of the shank portion intermediate of the head and threaded portions has been provided with a series of longitudinally-arranged grooves and ribs. An example of a tire-bolt of this type is set forth in a patent of the United States, No. 440,331, issued to me November 11, 1890, the bolts just referred to being produced by what is termed the "rolling" process. In that case the flutes or ribs terminated at the base of the bolt-head. An objection may be urged against the use of a tire-bolt thus made, because its strength is impaired at the junction of the head and shank by reason of such prolongation of the grooves and ribs. Another objection is that the tire itself, when in use, extends beyond or below the base of the bolt-head a short distance—say one-eighth of an inch or so—and as the wearing-surface of such portion of the bolt is limited to the face of the ribs in contact with the tire it follows that the jarring action produced by the wheel in running will have a tendency to disturb the fibers of the metal in a direction transversely of the bolt, thereby reducing its diameter, the bolt then no longer filling the hole in the tire.

In order to overcome the objections which may be made against fluted tire-bolts, I have devised one wherein the head and the adjacent portion of the shank are rendered stronger and more durable. To that end my invention consists of a headed rolled or swaged tire-bolt having a threaded and fluted shank portion and a plain or unfluted part uniting the head and fluted portions, the diameters of the said plain fluted and screw-threaded portions being substantially alike.

In the appended sheet of drawings, Figure 1 is a side elevation of a tire-bolt embodying my improvement. Fig. 2 is a sectional view of the tire and felly of the wheel enlarged, showing the bolt as in use. Fig. 3 is a longitudinal central sectional view taken through the upper portion of the bolt. Fig. 4 is a cross-sectional view taken through the plain or unfluted portion of the shank, as on line $x\ x$ of Fig. 1; and Fig. 5 is a similar sectional view taken on line $y\ y$ of Fig. 1.

I would state that the bolt herein shown and described is adapted to be produced by swaging or what is known as the "rolling" process—that is, the headed blanks are introduced singly between a pair of suitably-arranged reciprocating dies provided with ribs and grooves, which at one and the same time impress or form the screw-threads and flutes into the blank's surface, the diameter of the entire shank portion of the finished bolt exceeding that of the wire or blank from which it was formed. This is due to the action of the dies, which in operation seize upon the blank and force the metal from its surface in a radial direction, the length of the bolt being substantially the same as that of the blank from which it is made. A corresponding enlargement of the unfluted portion of the shank may be effected simultaneously with the upsetting of the metal in the die to form the bolt-head.

In the drawings, A indicates a tire-bolt provided with my improvement. The shank portion $a$ of the bolt consists of essentially three parts—namely, the threaded part $a'$, the grooved and fluted part $a^2$, communicating with the threaded part, and the unfluted portion $a^3$, communicating with the fluted portion $a^2$ and head $h$. It will be seen, referring to Fig. 3, that the grooves do not terminate abruptly, but gradually decrease in depth, as at $m$. It will also be seen that my improved bolt is stronger at the junction of the shank and head than my patented bolt before referred to, because it has an additional amount of metal equal to the sum of the cross-sectional areas of the several grooves.

My improved bolt is clearly represented as in use. (See Fig. 2, wherein $f$ indicates, sectionally, a portion of a wooden felly of a carriage-wheel, and $t$ the iron tire thereof.) A hole is drilled through the tire and wood to snugly receive the shank $a$ of the bolt, the tire itself being counterbored to receive the bolt's head. Now upon driving the bolt home it will be found that the ungrooved portion $a^3$ of the shank will be in close contact with the hole formed in the tire, and at the same time more or less of the fibers of the wood will expand into the grooves of the fluted portion $a^2$ of the shank, thereby checking any tendency of the bolt to turn on its axis. An exterior washer $w$ and nut $n$ serve, as common, to hold the bolt in position. The flutings may be made parallel with the axis of the bolt or at a slight inclination therewith, as desired. The form of the flutings cross-sectionally may also be varied or modified without departing from the spirit of the invention. I would state that, practically, I prefer to make the diameter of the screw-threaded portion of the shank $a$ a little less than the diameter of the fluted part, in order that the end portion of the bolt may not disturb the fibers of the wood while it is being inserted into the felly.

Without departing from the spirit of the invention, my improvement is equally well adapted to other types of bolts and screws—that is to say, the fluted portion $a^2$ of the screw-threaded shank may, as hereinbefore described, terminate in the plain or unfluted portion $a^3$, the latter uniting the fluted and headed portions of such bolts and screws.

I claim as my invention—

1. A rolled or swaged headed bolt or screw having a portion of its shank or stem screw-threaded and fluted and having that part of the shank contiguous to and uniting the head and fluted portions plain or ungrooved, substantially as hereinbefore described.

2. A headed bolt or screw having its shank provided at its entering end with screw-threads, the portion of the shank extending rearwardly from the screw-threaded part provided with ribs and grooves to form flutings, and the portion between and uniting the head and said fluted part being plain or unfluted, the diameter of the shank being substantially uniform throughout its length.

In testimony whereof I have affixed my signature in presence of two witnesses.

CHARLES D. ROGERS.

Witnesses:
CHARLES HANNIGAN,
GEO. H. REMINGTON.